Figure 1:
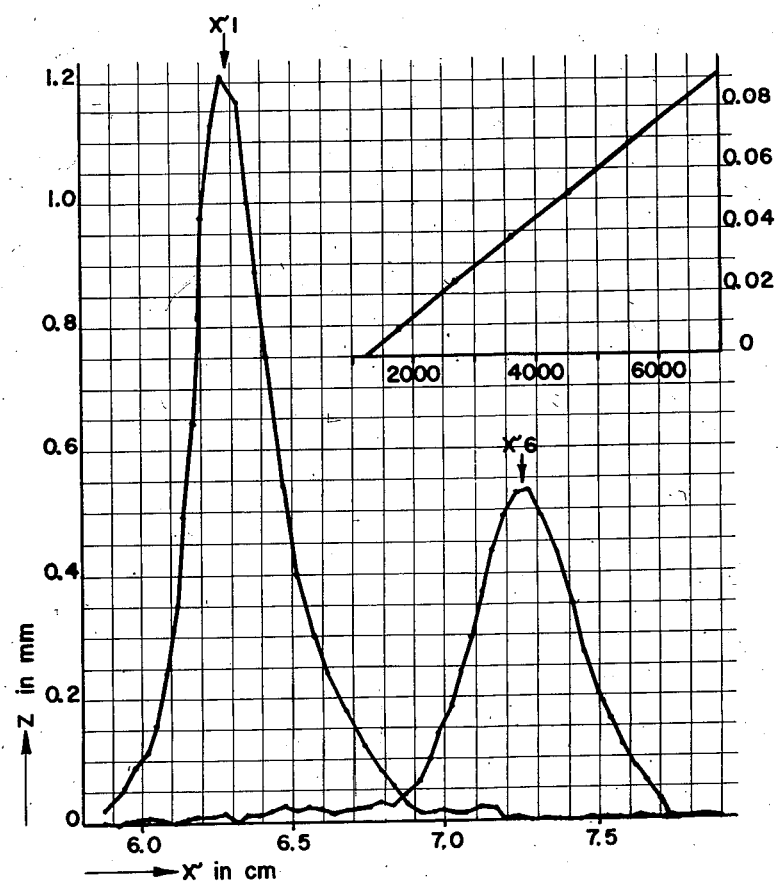

FIG. I

γ-Globulin

γ-Globulin B

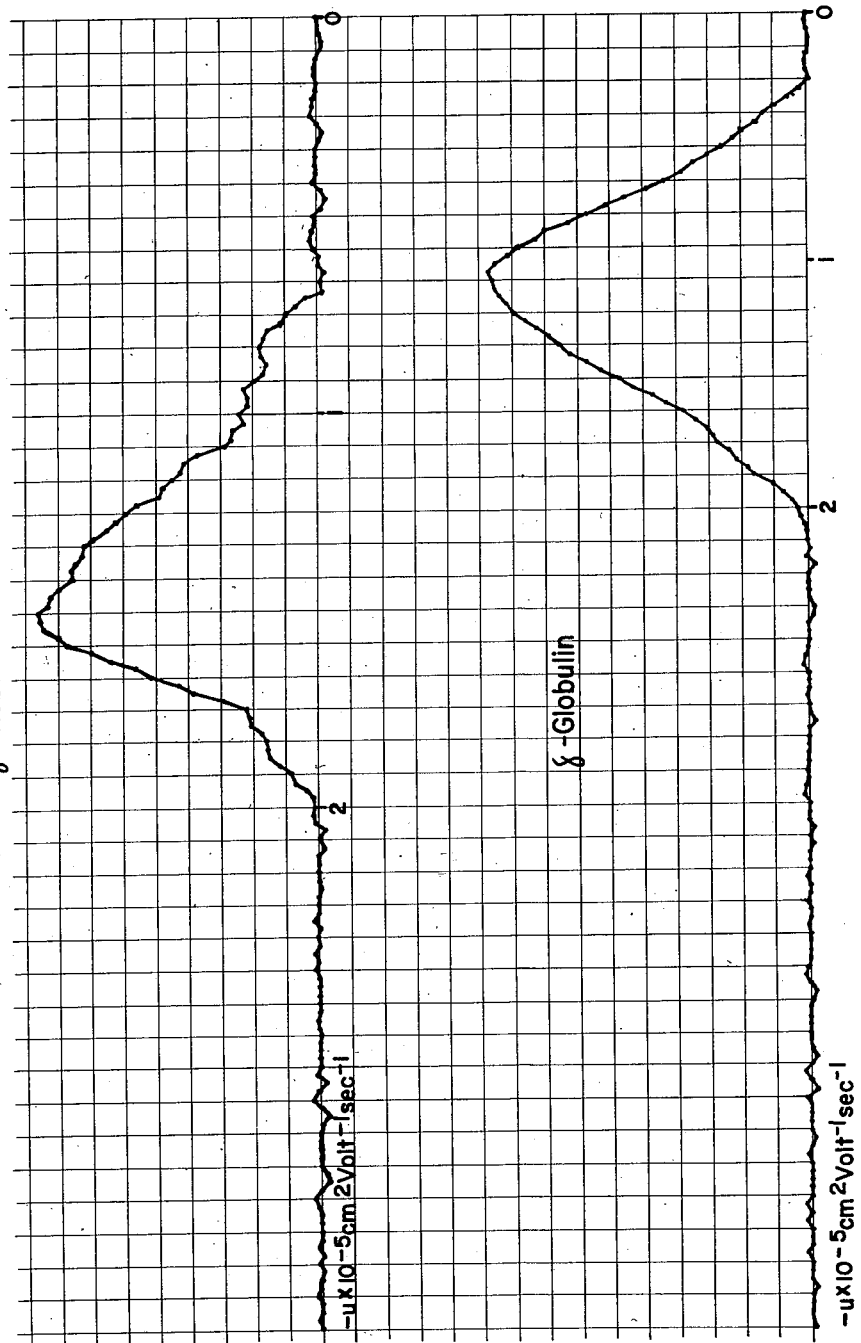

United States Patent Office 2,793,203
Patented May 21, 1957

2,793,203

PROCESS OF PREPARING STABLE, HIGHLY PURIFIED GAMMA GLOBULIN PREPARATIONS

Hermann E. Schultze, Max Schönenberger, and Heinz-Dietrich Matheka, Marbach, near Marburg an der Lahn, Germany, assignors to Behringwerke Aktiengesellschaft, Marburg an der Lahn, Germany, a German company Application July 30, 1953, Serial No. 371,234

Claims priority, application Germany August 4, 1952

4 Claims. (Cl. 260—112)

The present invention relates to a process of preparing stable, highly purified gamma globulin preparations; the invention essentially consists of a method for the fractional purification of human or animal serum or plasma; more specifically the invention relates to a process of separating albumins, beta globulins and alpha globulins from the starting materials named above by special process steps described hereafter in detail, thus obtaining stable, highly purified antibody-active gamma globulin preparations.

Various processes have already been known for some time which involve, by fractional ammonium sulfate precipitation, the isolation and the concentration of gamma globulins occurring in human or animal blood serum and plasma, which globulins, owing to their content of antibodies, are important for therapeutical and prophylactic purposes (see Cohn, McMeekin, Oncley, Newell and Hughes, "J. Amer. Chem. Soc.," vol. 62 (1940), page 3386). The gamma globulin preparations thus obtained have proven unsatisfactory as to their degree of purity determined by quantitative electrophoresis; attempts have, therefore, been made to separate the gamma globulin fraction of the blood serum or plasma by means of alcohol, while adjusting the pH to exactly defined values and applying an exactly defined ionic strength (see Cohn et al., U. S. Patent No. 2,390,074 and Williams and Deutsch, U. S. Patents Nos. 2,437,060 and 2,543,215). These protein fractionation processes based on alcohol or other organic water-soluble liquids yield pure gamma globulin fractions; however, considerable technical installations are required for carrying out these processes which can be operated only in low temperature laboratories owing to protein denaturation which takes place at normal room temperatures. Moreover, it has been found that even at temperatures below 0° the valuable gamma globulins are affected to a certain extent by alcohol and similar protein precipitants, thus involving an increase of the molecular weight which is readily detectable in the ultracentrifuge.

Now, we have found that the antibody-containing gamma globulin fraction of the blood serum or the plasma can be isolated in its original structure as a protein component uniformly depositing in the ultracentrifuge by a new fractionating process which consists in the combined use of neutral salts, dilute acid and aluminum hydroxide gel in an exactly defined succession of steps and under exactly defined conditions. The use of denaturating precipitants, such as alcohols, is thus avoided and it will be no longer necessary to carry out the process in the costly apparatus for refrigerating technique.

At first the crude albumin-free globulin fraction is separated from dilute blood serum or plasma in known manner by semi-saturation with ammonium sulfate, the reaction being neutral to feebly alkaline; according to the origin of the serum, the degree of saturation may vary between 45 and 55 percent and the concentration of the protein may vary between 3 and 4.5 percent.

The next step consists in removing the beta globulin fraction from this crude albumin-free globulin fraction. It is isolated from the alpha and gamma globulins by precipitation at an ionic strength of 0.07±0.02 and at a pH of 5.3 ± 0.05 in an aqueous medium at a protein concentration of 3–5 percent.

In order to adjust the desired ionic strength, sodium chloride, sodium acetate or another neutral salt may be used; for adjusting the pH to a value of 5.3, acetic acid or another weak acid may be used.

The alpha globulin fraction is then separated at a pH of 5.0±0.05, at an ionic strength being below about 0.001 and at a protein concentration of 2±0.5 percent.

The gamma globulins which under these conditions remain in the dissolved state are freed from the still adhering alpha and beta globulin impurities by a treatment with aluminum hydroxide gel; it may be advisable to determine the quantity required of aluminum hydroxide gel by a preliminary test.

The aluminum hydroxide gel used may, for example, be prepared as described by Willstätter and Kraut in "Berichte der Deutschen Chemischen Gesellschaft," vol. 56, 1923, page 1117.

For therapy and prophylaxis the gamma globulins may then be brought in the usual manner to the desired protein content, to a physiological pH and to the blood-isotonic salt content, sterilized and lyophilized, if required.

The gamma globulins obtained by the process herein described are free from albumins and alpha and beta globulins when they are subjected to electrophoresis in the "Tiselius" device; in the ultracentrifuge they behave just like a mono-disperse protein having a sedimentation constant of $S_{20}=6,1$. By subsequently subjecting a gamma globulin preparation, which has been isolated by the process of the present invention, to precipitation with alcohol at $-5°$ C. according to one of the known methods referred to above, the same denaturation product having the sedimentation constant of $S_{20}=9-10$ is observed in the ultracentrifuge; said product commonly appears when gamma globulin preparations are obtained by means of alcohol (see Figs. 1 and 2 of the accompanying diagrams). The gamma globulin preparations obtained by the process of the present invention are free from proteolytic enzymes, such as plasmin and fibrinolysin; they, therefore, are stable.

The details of the new process which, with the aid of known modifications, may be applied to human or animal blood serum as well as to plasma, are illustrated, by way of example, in the following examples, without limiting it thereto:

EXAMPLE 1

10 liters of human blood serum are diluted with 7.1 liters of water so as to have a total protein content of 3.8 percent, then adjusted with an alkali hydroxide to a pH of 8.0 and finally mixed slowly, while stirring, with 13.9 liters of saturated ammonium sulfate solution having the same pH. The precipitate formed contains, in addition to alpha and beta globulins, substantially the total amount of the gamma globulins occurring in the blood serum and only a very small amount of albumin. The precipitate is dissolved by the addition of 1.5 liters of water and 23 cc. of sodium bicarbonate solution of 10 percent strength, and the concentrate obtained is freed, suitably by centrifugation or filtration, from traces of sediments which may be present. The ammonium sulfate which has been brought into the solution is then decreased to below 0.05 percent by dialysis against feebly alkaline outer water, and the dialysate is adjusted to 3.8 percent of protein and 0.4 percent of sodium chloride by the addition of said salt and water. An ionic strength of 0.07 is thus attained. The solution is then acidified, while stirring, to a pH of 5.3±0.05 by the addition of 90 cc. of acetic acid of 2 percent strength. A precipitate is formed essentially consisting of beta globulins which is removed in an efficient centrifuge with a high number of revolutions. The liquid is adjusted to a pH of 7.2±0.1 by means of 90 cc. of sodium bicarbonate solution of 10 percent strength and freed from chlorine ions by dialysis against distilled water which is maintained at a pH of 7.2 by a trace of sodium hydroxide solution. The ionic strength is then below 0.001. The liquid is then diluted with distilled water to obtain a protein content of 2 percent and mixed, while stirring, with 140 cc. of acetic acid of 2 percent strength, a pH value of 5.0±0.05 optimal for the isolation of the gamma globulins being thus attained. The precipitate produced is removed by centrifugation and the small residual portion of alpha and beta globulins remaining in the centrifuged product of 6.2 liters is removed by absorption on aluminum hydroxide.

For this purpose the quantity of 620 cc. of aluminum hydroxide gel of 2 percent strength, which has been ascertained by a preliminary test as not reducing the content of dissolved gamma globulin, is stirred into the centrifuged product. After the separation of the aluminum-protein-adsorbate by decanting, filtering or centrifuging, a clear, colorless solution of 6.5 liters is obtained containing 1.15 percent of protein which consists only of gamma globulins.

Since the normal human blood serum used as starting material contained, as a total, 6.5 percent of proteins, 15 percent of which consisted of gamma globulin as ascertained by electrophoretic analysis, the yield of gamma globulin amounts to 85 percent, the concentration factor being 9.

In the product obtained by the process of the present invention, which product has been brought in known manner to a neutral reaction, a physiological salt content and a protein content of 16 percent, the natural diphtheria antitoxins present in the starting blood serum have been enriched to 20 times of their original concentration. Moreover, the concentrate contains active protective substances against measles, hepatitis epidemica, poliomyelitis and other infectious diseases.

The high degree of purity of the human gamma globulin preparation as obtained by the process of the present invention becomes evident by the Diagrams 1 to 6 attached hereto and illustrating the ultracentrifugation and the electrophoresis. Similar tests of different commercial gamma globulin concentrates prepared by the aforenamed alcohol method show in the ultracentrifuge (Diagrams 3, 4 and 5) the presence of a denaturation product of the sedimentation constant 9–10, which occurs even if the product be subsequently precipitated at −5° C. with alcohol by one of the usual processes and be then redissolved (see Diagram 2). As regards its electrophoretic mobility in the Tiselius apparatus, the product obtained by the present invention distinctly differs from the other preparations (see Diagram 6).

*Explanation of the accompanying diagrams*

Fig. 1: behaviour in the ultracentrifuge of the gamma globulins obtained by the process of the present invention.

Figure 2:
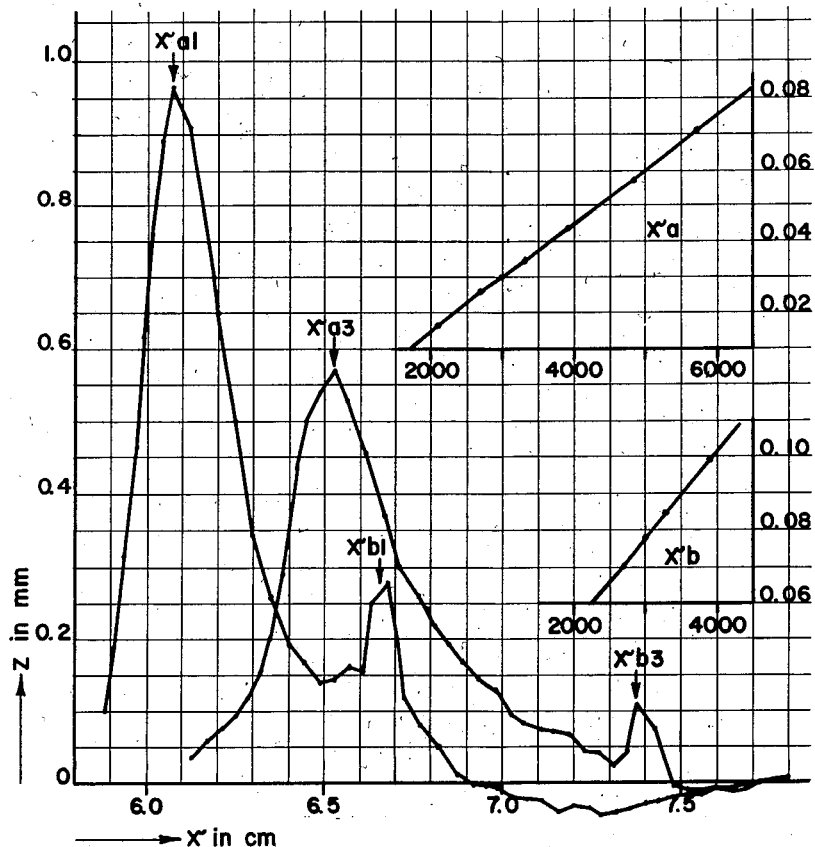

Fig. 2: behaviour in the ultracentrifuge of the gamma globulins obtained by the process of the present invention, after a subsequent treatment, at −5° C., with alcohol.

Figure 3:
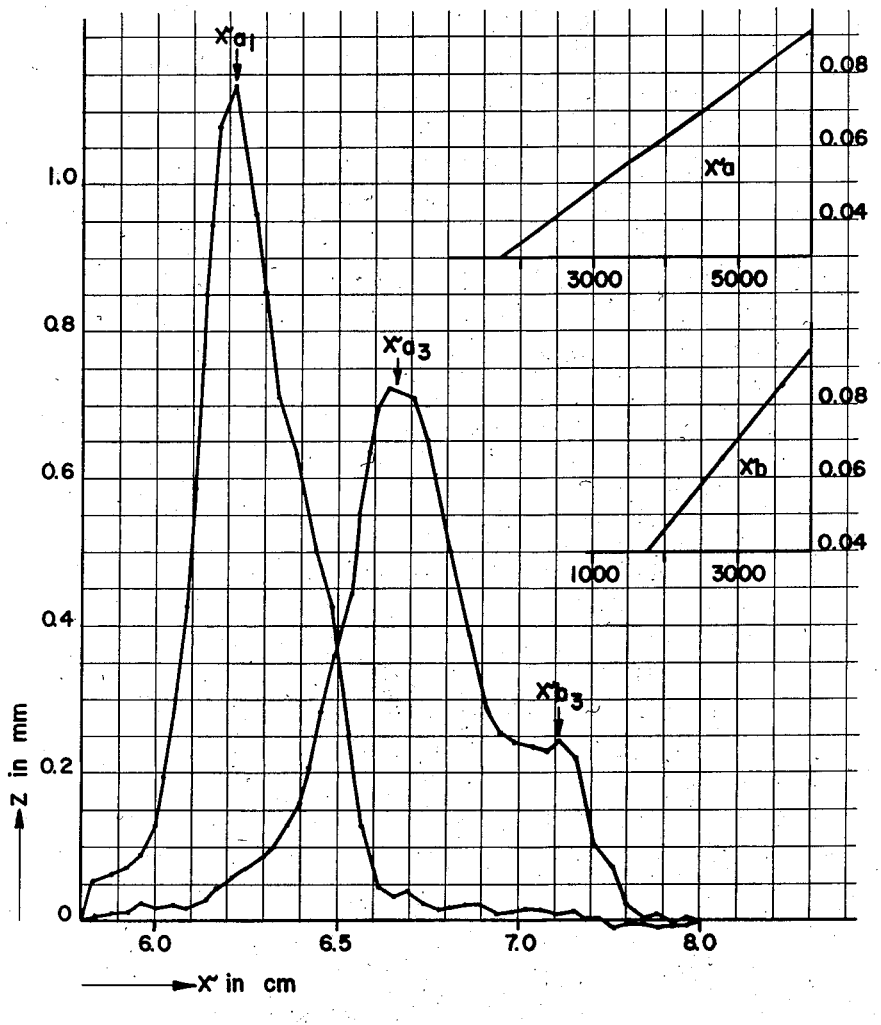
Figure 4:
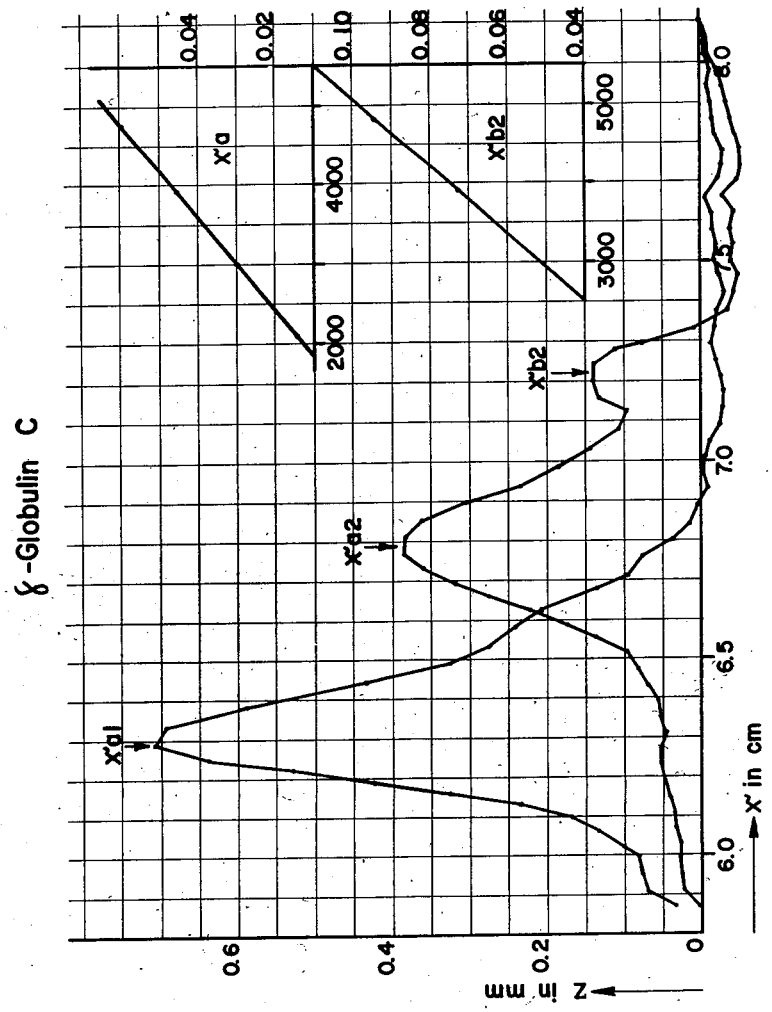
Figure 5:
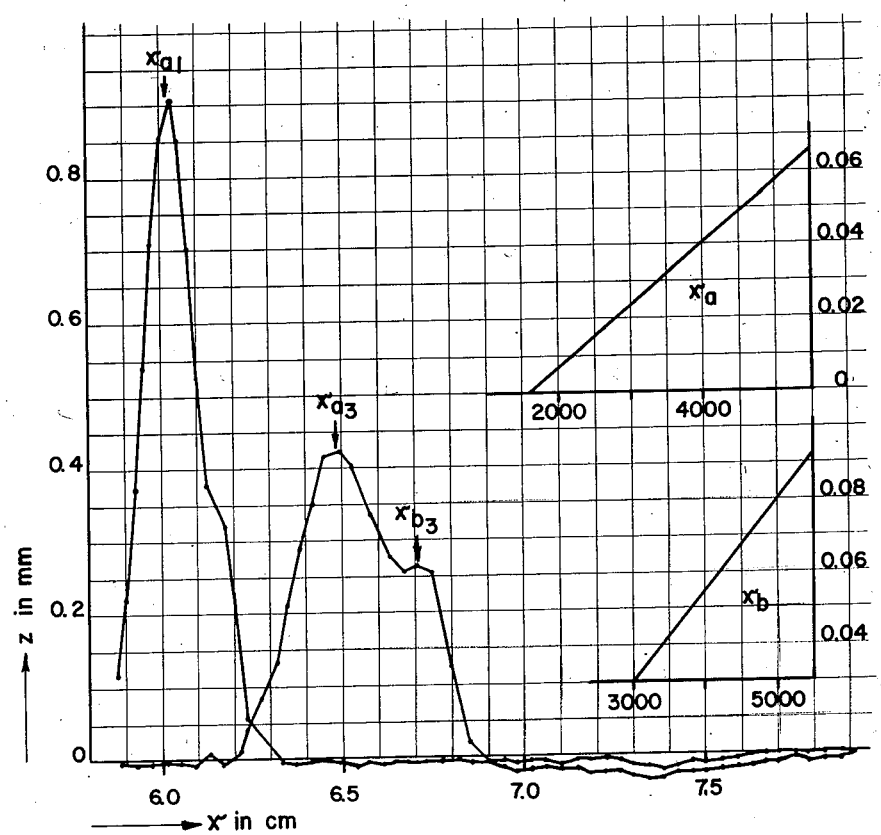

Figs. 3, 4, and 5: behaviour in the ultracentrifuge of the gamma globulins obtained with the application of alcohol.

Fig. 6: electrophoretic behaviour of gamma globulins obtained with application of alcohol (top part) and obtained by the process of the present invention (below).

EXAMPLE 2

10 liters of antidiphtheric bovine blood serum containing 1000 I. U. per cc., 9.06 percent of total protein and 4.41 percent of gamma globulin are mixed, while stirring, and at a pH of 8.0, with 13.84 liters of water and 23.84 liters of saturated ammonium sulfate solution. The globulin precipitate thus obtained is collected on a suction filter. It has a moist weight of 1.5 kilograms with 648 grams of protein, i. e. 71.6 percent of the original quantity. The beta globulins contained therein are removed as described in Example 1, after dialysis and dilution to a volume of 17.02 liters at an ionic strength of 0.07 (0.4 percent of sodium chloride) and at a pH value of 5.3, the adjustment requiring 380 cc. of acetic acid of 2 percent strength. 521 grams of protein, i. e. 57.5 percent of the original quantity, remain in the dissolved condition. The alpha globulins are isolated by reducing the ionic strength by dialysis to about 0.001; by the addition of distilled water the volume is made up to 26.06 liters and by introducing, while stirring, 520 cc. of acetic acid, the pH is adjusted to 5.0. The supernatant liquid of 26.1 liters contains 470 grams of protein corresponding to 51.8 percent of the original quantity. The treatment, likewise carried out as described in Example 1, with 2.61 liters of aluminum hydroxide gel of 2 percent strength, at a pH of 5.0, yields a pure gamma globulin solution containing in 28.23 liters 353 grams of protein, i. e. 39 percent of the original quantity. The yield of gamma globulins amounts to 80 percent.

After neutralization with sodium bicarbonate solution, the liquid freed from albumin, alpha and beta globulins is lyophilized, i. e. frozen at a low temperature and dried under high vacuum. The dry gamma globulin preparation rapidly and completely dissolves in physiological saline to form a clear solution and shows, when tested on animals and having a protein content of 20 percent, an activity of 5000 I. U. of diphtheria antitoxin per cc. The loss of antibodies occurring during processing is, therefore, below 15 percent.

EXAMPLE 3

10 liters of tetanus horse plasma containing 850 I. U. (new international standard) per cc., 7.69 percent of total proteins, 3 percent of which are T- and gamma globulins, are mixed, while stirring, at a pH of 8.0, with 10.2 liters of water and 5.0 liters of saturated ammonium sulfate solution. The fibrinogen chiefly contained in the precipitate is filtered with suction and the filtrate is brought to semi-saturation at a pH of 8.0 with further 15 liters of ammonium sulfate. The globulin precipitate is collected on a suction filter. It has a moist weight of 1.3 kilograms with 461.4 grams of proteins, i. e., 60 percent of the original quantity. The beta globulins contained therein are removed as described in Example 1, after dialysis, by dilution to a volume of 12.1 liters at an ionic strength of 0.07 (0.4 percent of sodium chloride) and at a pH value of 5.3, the adjustment requiring 340 cc. of acetic acid of 2 percent strength. 419.1 grams of proteins, i. e. 54.5 percent of the original quantity, remain in the dissolved state. The alpha globulins are isolated by reducing the ionic strength by dialysis to about 0.001; by the addition of distilled water the volume is made up to 20.9 liters, and by introducing, while stirring, 320 cc. of acetic acid of 2 percent strength, the pH is adjusted to 5.0. The last traces of fibrinogen are removed from the 20.9 liters of supernatant liquid with 5000 U. of thrombin at a pH of 7.0. The quantity of thrombin required is determined by a preliminary test. After filtration, the 20.9 liters contain a protein quantity of 356.8 grams, i. e. 46.4 percent of the original quantity. The treatment with 2.09 liters of aluminum hydroxide gel of 2 percent strength, likewise carried out as described in the preceding examples at a pH of 5.0, yields a pure gamma globulin solution containing the T-component; 269 grams of protein, i. e. 35 percent of the original quantity, are contained in 21.5 liters of the gamma globulin solution. The yield of gamma globulin amounts to 90 percent. After the neutralization with sodium bicarbonate solution, the liquid freed from albumins, alpha and beta globulins is lyophilized. In animal tests, at a protein content of 20 percent the activity is 5000 I. U. of tetanus antitoxin per cc., i. e. 25,000 I. U. per gram of protein. The loss of antibodies after processing amounts, therefore, to 20 percent. The concentration factor is calculated as 2.3.

We claim:

1. The process of preparing stable highly purified gamma globulin preparations of uniform molecular size from a member selected from blood serum and plasma containing antibodies, which comprises precipitating a crude albumin-free globulin fraction by semi-saturation with ammonium sulfate, the reaction being neutral to feebly alkaline, isolating by precipitation from said crude albumin-free globulin fraction, thus obtained, at an ionic strength of $0.07 \pm 0.02$ at a pH of $5.3 \pm 0.05$ and a protein concentration of about 3–4 percent the main portion of beta globulins, and at an ionic strength below about 0.001, at a pH of $5.0 \pm 0.05$ and a protein content of $2 \pm 0.5$ percent the main portion of alpha globulins and separating residual proportions still present of alpha and beta globulins in the form of insoluble aluminum compounds by the addition of aluminum hydroxide gel at a pH of $5.0 \pm 0.05$.

2. The process of preparing stable highly purified gamma globulin preparations of uniform molecular size from human blood serum containing antibodies which comprises precipitating a crude albumin-free globulin fraction by semi-saturation with ammonium sulfate, the reaction being neutral to feebly alkaline, isolating by precipitation from said crude albumin-free globulin fraction at an ionic strength of $0.07 \pm 0.02$, at a pH of $5.3 \pm 0.05$ by using acetic acid of 2 percent strength and a protein concentration of about 3–4 percent the main portion of beta globulins, and at an ionic strength below about 0.001, at a pH of $5.0 \pm 0.05$ by using acetic acid of 2 percent strength and a protein content of $2 \pm 0.5$ percent the main portion of alpha globulins and separating residual proportions still present of alpha and beta globulins in the form of insoluble aluminum compounds by the addition of aluminum hydroxide gel at a pH of $5.0 \pm 0.05$.

3. The process of preparing stable highly purified gamma globulin preparations of uniform molecular size from animal blood serum containing antibodies which comprises precipitating a crude albumin-free globulin fraction by semi-saturation with ammonium sulfate, the reaction being neutral to feebly alkaline, isolating by precipitation from said crude albumin-free globulin fraction, at an ionic strength of $0.07 \pm 0.02$, at a pH of $5.3 \pm 0.05$ by using acetic acid of 2 percent strength and a protein concentration of about 3–4 percent the main portion of beta globulins, and at an ionic strength below about 0.001, at a pH of $5.0 \pm 0.05$ by using acetic acid of 2 percent strength and a protein content of $2 \pm 0.5$ percent the main portion of alpha globulins and separating residual proportions still present of alpha and beta globulins in the form of insoluble aluminum compounds by the addition of aluminum hydroxide gel at a pH of $5.0 \pm 0.05$.

4. The process of preparing stable highly purified gamma globulin preparations of uniform molecular size from horse plasma containing antitetanus bodies which comprises precipitating a crude albumin-free globulin fraction by semi-saturation with ammonium sulfate, the reaction being neutral to feebly alkaline, isolating by precipitation from said crude globulin fraction free from albumin and mainly free from fibrinogen, thus obtained, at an ionic strength of $0.07 \pm 0.02$, at a pH of $5.3 \pm 0.05$ by using acetic acid of 2 percent strength and a protein concentration of about 3–4 percent the main portion of beta globulins, and at an ionic strength below about 0.001, at a pH of $5.0 \pm 0.05$ by using acetic acid of 2 percent strength and a protein content of $2 \pm 0.5$ percent the main portion of alpha globulins and separating residual proportions still present of alpha and beta globulins in the form of insoluble aluminum compounds by the addition of aluminum hydroxide gel at a pH of $5.0 \pm 0.05$.

References Cited in the file of this patent

UNITED STATES PATENTS

| | | |
|---|---|---|
| 2,369,111 | Parfentjev | Feb. 6, 1945 |
| 2,390,074 | Cohn | Dec. 4, 1945 |
| 2,469,193 | Cohn | May 3, 1949 |

OTHER REFERENCES

Anson et al.: "Advances in Protein Chem.," vol. IV, pp. 457–458 (1948).

Anson et al.: "Advances in Protein Chem.," vol. III, pp. 86–91, 176–178, and 415–437 (1947).